UNITED STATES PATENT OFFICE.

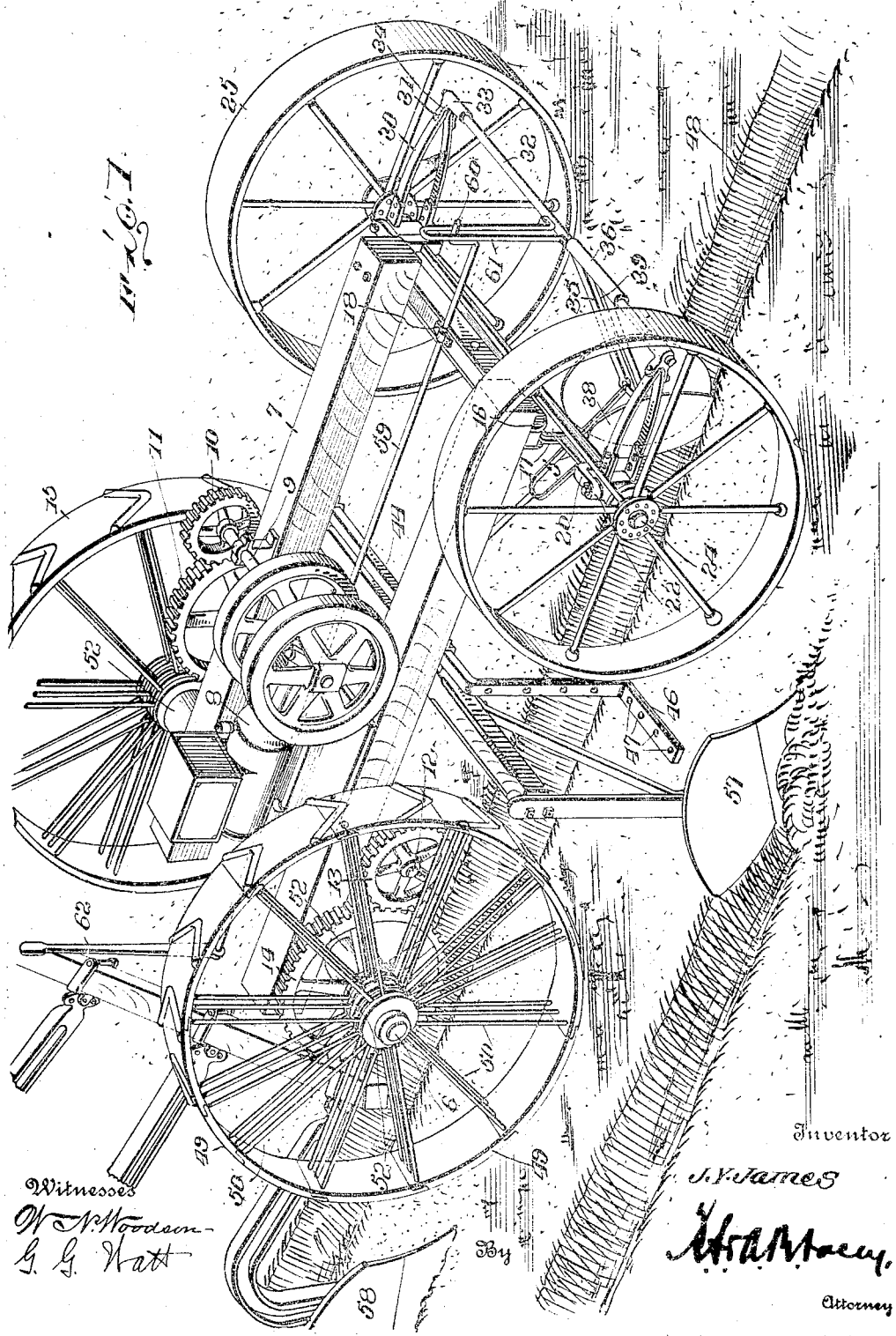

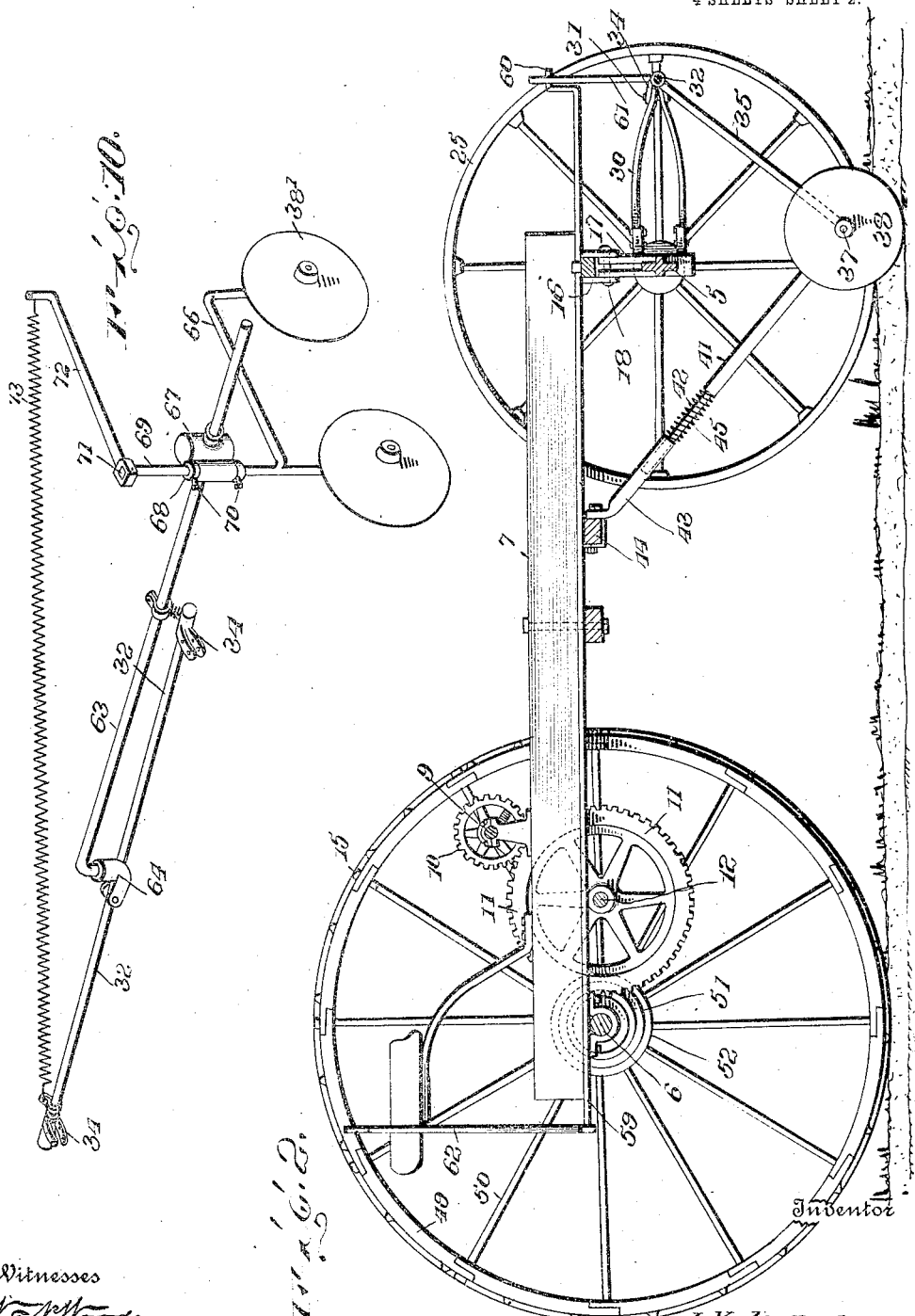

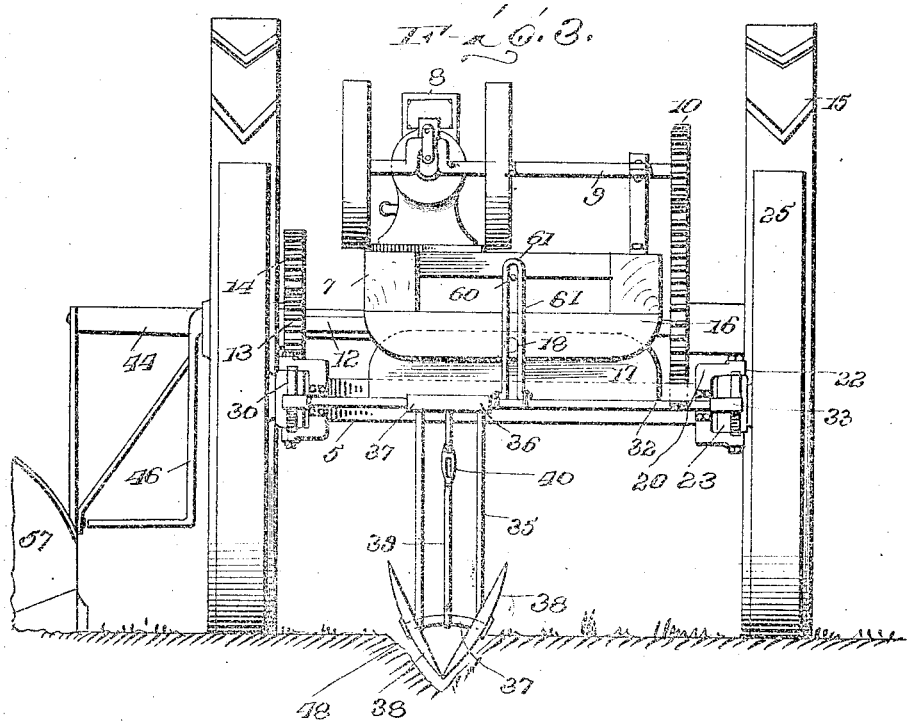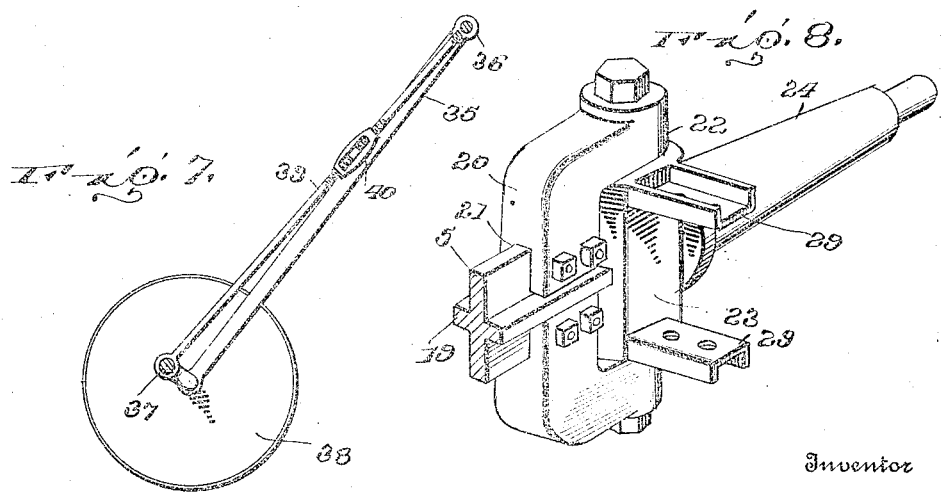

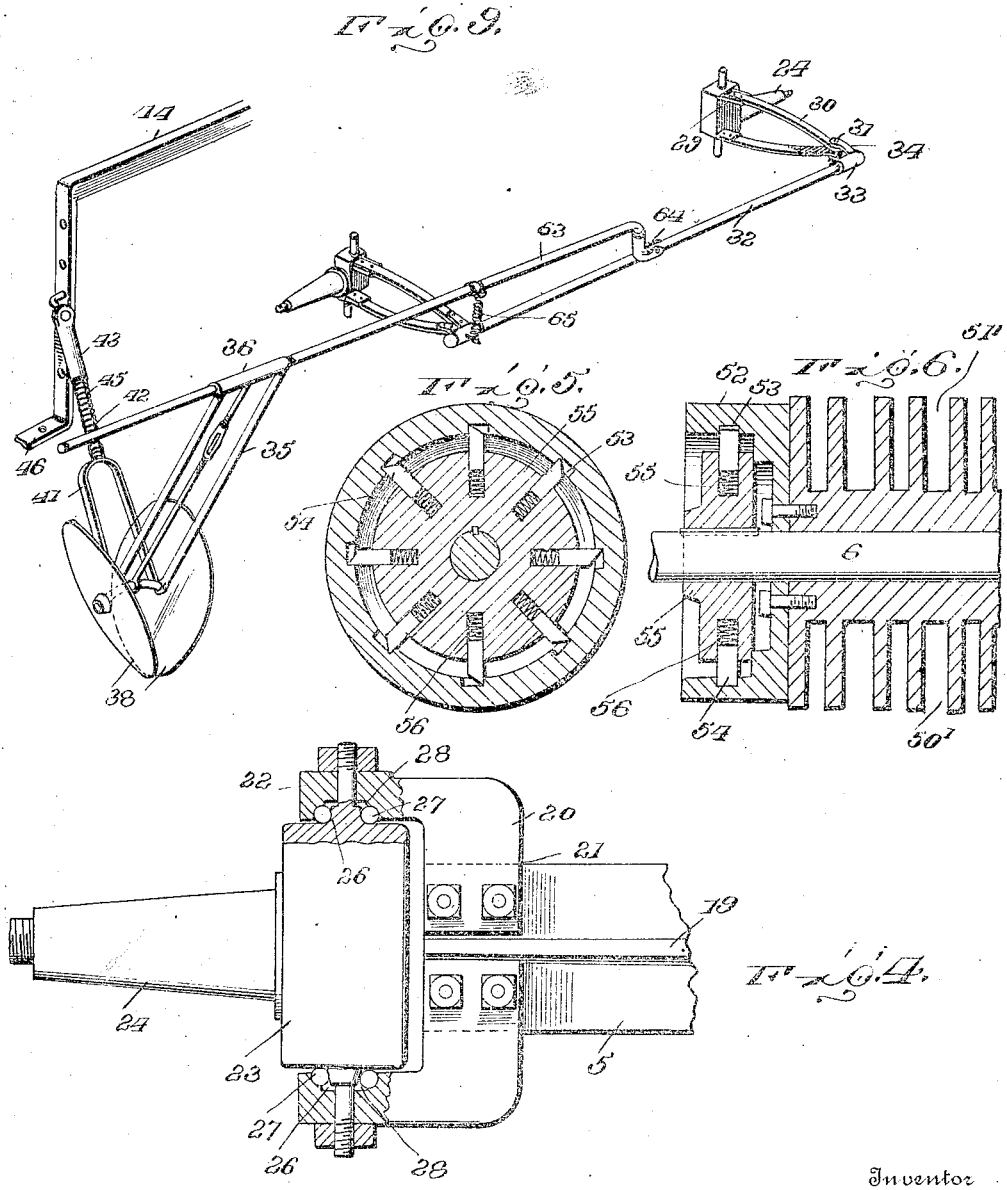

JOHN Y. JAMES, OF SAYRE, OKLAHOMA, ASSIGNOR OF ONE-HALF TO HENRY B. HEFNER, OF CHICAGO, ILLINOIS.

AUTOMATIC STEERING DEVICE.

1,047,644.  Specification of Letters Patent.  Patented Dec. 17, 1912.

Application filed May 16, 1911. Serial No. 627,618.

*To all whom it may concern:*

Be it known that I, JOHN Y. JAMES, citizen of the United States, residing at Sayre, in the county of Beckham and State of Oklahoma, have invented certain new and useful Improvements in Automatic Steering Devices, of which the following is a specification.

This invention relates to automatic steering devices for motor driven trucks, agricultural machinery and the like.

The object of the invention is to provide a motor truck of simple and durable construction, capable of making a relatively short turn and which will automatically follow the furrow so as to guide the machine around a field or other inclosure without attention on the part of the operator.

A further object is to provide a truck, the forward wheels of which are pivotally mounted on the front axle and connected by a transverse steering rod from which are suspended co-acting pilot wheels or disks adapted to travel in a furrow.

A further object is to provide means for adjusting the disks or pilot wheels to present either the converging or diverging edges of the disks to the furrow, and means for yieldably supporting said disks in the furrow so as to prevent injury thereto should the disks strike a stone or other obstruction in said furrow.

A further object is to provide the steering rod with an arm or extension so as to permit the pilot wheels or disks to be placed on either side of the front wheels of the truck when listing or planting.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

For a full understanding of the invention and the merits thereof, reference is to be had to the following description and accompanying drawings, in which:

Figure 1 is a perspective view of a motor driven truck constructed in accordance with my invention, showing the position of the pilot wheels or disks when the device is used for cultivating; Fig. 2 is a longitudinal sectional view of the same; Fig. 3 is a front elevation; Fig. 4 is a side elevation, partly in section of one of the pivoted knuckles of the front axle, showing the construction of the same; Fig. 5 is a transverse sectional view, showing the construction of the clutch mechanism on the rear driving wheels of the truck; Fig. 6 is a longitudinal sectional view of Fig. 5; Fig. 7 is a vertical sectional view, showing the construction of the crank shaft of the pilot wheels or disks; Fig. 8 is a perspective view of one of the knuckles detached; Fig. 9 is a perspective view, showing the extension rod in position on the steering rod and the pilot wheels or disks adjusted thereon for listing or planting; Fig. 10 is a perspective view, showing the construction of the pilot wheels or disks when the device is used for breaking land.

Corresponding and like parts are referred to in the following description and indicated in all the views of the drawings by the same reference characters.

The motor driven truck comprises front and rear axles 5 and 6 connected by spaced longitudinally disposed sills 7 on which is mounted a motor 8 of any suitable construction. Secured to the driving shaft 9 of the motor, is a pinion 10 which meshes with a gear wheel 11 secured to one end of a transverse shaft 12, there being a similar pinion 13 secured to the other end of the shaft 12 and adapted to mesh with a master gear 14 mounted on the rear axle 6, so that motion may be transmitted from the motor 8 through the medium of the gearing to the rear ground wheels 15 of the truck for propelling the latter over a field or other inclosure.

Depending from the longitudinal sills 7, at the front of the truck, are spaced plates 16 which overlap corresponding plates 17 mounted on the front axle 5, said plates being pivotally connected by a transverse bolt 18 so as to permit a slight tilting movement of the axle 5 in a vertical plane when the machine is traveling over rough, uneven ground, while at the same time preventing horizontal pivotal movement of said front axle. The front axle 5 is preferably provided with oppositely disposed reinforcing ribs 19 which bear against the lower edges of the plates 17 and serve to assist in supporting the same.

Bolted or otherwise rigidly secured to the opposite ends of the front axle 5, are brackets 20, each preferably formed in two sections having their inner ends provided with grooves 21 adapted to receive the adjacent longitudinal edges of said axle and their outer ends provided with overhanging arms 22, between which are pivotally mounted knuckles 23. The knuckles 23 are provided with stub axles 24 on which are journaled the front wheels 25 of the truck. The upper and lower faces of the knuckles 23 are preferably provided with race-ways 26 for the reception of anti-friction balls 27, there being corresponding race-ways 28 formed in the lower faces of the arms 22 so as to prevent accidental displacement of said balls.

Extending laterally from one side of each knuckle 23, are spaced fingers 29 having seating recesses formed therein for the reception of laterally extending arms 30. The inner ends of the arms 30 are bolted or otherwise rigidly secured to the fingers 29, while the outer ends thereof are disposed on converging lines and rigidly united by a bolt or similar fastening device 31. The arms 30 are connected by a transverse rod 32, on the opposite ends of which are mounted tubular members or sockets 33, having spaced fingers 34 which overlap the adjacent arms 30 to permit the passage of the fastening devices 31, so that when the rod 32 is shifted transversely of the truck, a corresponding movement will be simultaneously imparted to both of the front wheels 25 of said truck for the purpose of steering the latter.

Depending from the connecting rod 32, is a frame 35 including spaced side bars having their upper ends connected by a tubular member or sleeve 36 which embraces the rod 32 and forms a pivotal connection between the rod and frame. The lower ends of the side bars of the frame 35, are provided with transverse perforations, in which is journaled a curved or arched stub shaft 37 having co-acting pilot wheels or disks 38 mounted for rotation thereon and adapted to travel in a furrow for the purpose of guiding the truck.

As a means for adjusting the pilot wheels or disks 38 so as to present either the converging or diverging edges of said disks to the furrow, there is provided a rod 39, preferably formed in two sections, one of which is connected with the intermediate bowed or curved portion of the stub shaft 37, while the other is connected with the sleeve 36. The inner ends of the rod sections 39 are threaded for engagement with a turn buckle 40 so that by rotating said turn buckle, the lower rod section 39 may be lengthened or shortened and thus rotate the stub shaft 37 to effect the angular movement of the pilot wheels or disks 38.

Secured to the stub shaft 37, is a yoke 41 having an upwardly and rearwardly extending arm 42, the free end of which is slidably mounted in a tubular member 43 detachably secured to a transverse draft bar 44, there being a spring 45 interposed between the tubular member 43 and fork 41 so as to permit a slight vertical movement of the pilot wheels or disks and thus prevent injury thereto should said wheels or disks strike a stone or other obstruction in the furrow. The draft bar 44 is detachably secured to the longitudinal sills 7 by bolts or similar fastening devices, one end of the bar being extended downwardly at the rear of the adjacent forward wheel 25 and thence laterally to form an arm 46, there being spaced perforations 47 formed in the body of the draft bar and arm 46 so as to permit the tubular member 43 to be attached at any point on the draft bar, as for instance, when the pilot wheels or disks are adjusted laterally of the machine for listing or planting. Thus it will be seen that as the co-acting disks or pilot wheels 38 travel in the furrow 48, said disks, by engagement with the walls of the furrow will follow the latter, and through the medium of the connecting rod 32 and arms 30, steer the front wheels of the truck, as will be readily understood.

The rims of the rear wheels 15 of the truck, are preferably formed of a plurality of overlapping sections 49 connected by spokes 50 with the hubs 51 thereof, there being circumferential recesses 51' formed in the hubs of the wheels to receive the intermediate portions of the spokes. The spokes 50 are each preferably formed of a single length of metal bent upon itself so as to fit within the adjacent recess 51', the opposite ends of the spokes being extended through the overlapped ends 49 of the rim sections and riveted or otherwise rigidly secured thereto.

Secured to the hub of each rear wheel 15, is a casing 52 having a series of spaced recesses or sockets 53 formed therein for engagement with suitable spring pressed pawls 54 slidably mounted in collars 55 keyed or otherwise rigidly secured to the rear axle 6, as best shown in Fig. 6 of the drawings. The outer ends of the pawls 54 are inclined or beveled and normally held in engagement with the sockets or recesses 53 by a coil spring 56, the pawls on one of the wheels being inclined in a direction opposite the pawls on the other wheel of the truck so as to permit one of the wheels to rotate faster than the other when making a turn. A plow share 57 is preferably suspended from the truck at the rear and to one side of one of the front wheels 25, the rear plows 58 being so arranged that one of said plows will turn the soil at the rear of the adjacent wheel 15.

As a means for steering the truck when the furrow pilot is not in use, that is to say, when transporting the truck from one portion of a field to another, there is provided a steering rod 59, one end of which is bent to form a crank arm 60 which operates in a vertically disposed loop 61 detachably secured to the connecting rod 32, as shown. The other end of the rod 59 projects at the rear of the truck and is provided with an operating handle 62 by means of which said rod may be rotated so as to cause the crank arm 60 to bear against either wall of the loop 61 and through the medium of the rod 32 and arms 30, tilt the front wheels of the truck to effect the guiding thereof.

When the truck is used for listing or planting, an extension rod 63 is detachably secured to the connecting rod 32 and the furrow pilot mounted on the free end of said extension rod and to one side of the forward wheel of the truck, as best shown in Fig. 9 of the drawings. The extension rod 63 is pivotally mounted on the connecting rod 32 by a clip 64, there being a spring 65 forming a yieldable connection between the rod 63 and adjacent socket 33 so as to normally and yieldably hold the pilot wheels or disks against the furrow.

When the truck is used for breaking land, I employ a furrow pilot of the construction shown in Fig. 10 of the drawings, the disks or wheels 38' being disposed one in advance of the other and inclined downwardly with respect to the supporting bracket 66. In this form of the device, a casting 67 is loosely mounted on the extension rod 63 and is provided with a vertically disposed recess is adapted to receive a vertical extension or rod 69 on the supporting bracket 66, said rod 69 being held against rotation by suitable set screws 70 and provided with a squared terminal 71 which fits within a correspondingly squared socket formed in an arm 72, the free end of the latter being connected with the connecting rod 32 of the truck by means of a coil spring 73, as shown.

When the device is used for cultivating, the loop 61 is detached from the connecting rod 32 and the co-acting pilot wheels or disks 38 fastened on said connecting rod 32 in the manner shown in Fig. 1 of the drawings, so that as the truck travels over a field, the wheels of said truck will span the furrow with the pilot wheels or disks engaging the furrow, thus to guide the truck.

When listing or planting, the rod 63 is attached to the intermediate portion of the connecting rod 32 and the pilot wheels or disks adjusted to the position shown in Fig. 9 of the drawings, in which event, the pilot wheels or disks will follow the last furrow and thus automatically guide the truck around the entire field without attention on the part of the operator. When the device is used for breaking land, the pilot wheels or disks 38 are removed from the extension rod 63 and the pilot wheels or disks 38' placed in position thereon in the manner shown in Fig. 10 of the drawings. Thus it will be seen that after a furrow has once been formed and the pilot wheels or disks positioned therein, the disks will follow the successive furrows until the entire field has been cultivated.

While the furrow pilot is preferably in the form of co-acting disks, it will of course be understood that said furrow pilot may assume the form of spoked wheels, and that but a single wheel or disk may be employed to effect the guiding of the truck, without departing from the spirit of the invention.

Having thus described the invention, what is claimed as new is:

1. A truck including pivoted front wheels, a rod disposed in front of and connecting said wheels, a furrow pilot operatively connected with the rod for automatically guiding the truck, and means disposed between said truck and furrow pilot in rear of said rod for yieldably holding the pilot in its lowered operative position.

2. A truck including pivoted front wheels, a rod connecting said wheels, a furrow pilot operatively connected with the rod and including co-acting disks arranged at an angle to each other, and means for adjusting said disks to present either the converging or diverging edges thereof to the furrow.

3. A truck including pivoted front wheels, a rod connecting said wheels, a furrow pilot operatively connected with the rod and including a frame having co-acting disks mounted for rotation therein and disposed at an angle to each other, means for adjusting said disks to present either the converging or diverging edges thereof to the furrow, and a yieldable connection between the frame and truck.

4. A truck including pivoted front wheels, a rod connecting said wheels, spaced supports carried by said rod, a bowed shaft journaled in said supports, co-acting disks carried by said shaft, and means for rotating the shaft to vary the relative positions of the disks.

5. A truck including a front axle, brackets secured to the opposite ends of the front axle, knuckles pivotally mounted in said brackets and provided with attaching fingers, forward wheels mounted for rotation on the knuckles, arms having their inner ends secured to the attaching fingers and their outer ends united, a rod forming a connection between the united ends of the arms, a furrow pilot operatively connected with the rod and including spaced side members having a bowed shaft journaled therein and provided with co-acting disks, a connection between the shaft and truck, and means for rotating the shaft to present either the converging or diverging edges of the disks to the furrow.

6. A truck including pivoted front wheels, a transverse bar secured to the truck in rear of said wheels, a rod connecting the front wheels, a furrow pilot operatively connected with said rod, and an extensible connection between the transverse bar and said furrow pilot.

7. A truck including a front axle, knuckles pivotally mounted on the front axle and provided with stub shafts, wheels journaled on the stub shafts, attaching fingers extending forwardly from the knuckles, converging arms rigidly secured to the attaching fingers, a rod disposed in front of the axle and forming a connection between the converging ends of the arms, a bar extending transversely across the truck at the rear of the front wheels thereof, a furrow pilot operatively connected with the rod disposed in front of the axle, and a yieldable connection between said furrow pilot and the transverse bar at the rear of the wheels.

8. A truck including a front axle, knuckles pivotally mounted on the axle and provided with stub shafts, forward wheels journaled on the stub shafts, spaced attaching fingers extending laterally from the knuckles, converging arms rigidly secured to the attaching fingers, a connecting rod, sockets secured to the opposite ends of the connecting rod and provided with fingers embracing and secured to the arms, an extension rod secured to the connecting rod, a furrow pilot pivotally mounted on the extension rod, a transverse bar secured to the truck, and a yieldable connection between the transverse bar and said furrow pilot.

9. A truck including pivoted front wheels, a rod forming a connection between said wheels, an extension rod mounted on the first mentioned rod, a furrow pilot pivotally mounted on the extension rod, a connection between the furrow pilot and frame of the truck, and a spring forming a yieldable connection between the extension rod and said first mentioned rod.

10. A truck including pivoted front wheels, a rod forming a connection between the front wheels, a furrow pilot operatively connected with the rod and including spaced side bars, a bowed shaft journaled in the side bars, co-acting disks mounted on said shaft, a sectional rod having one section thereof secured to the furrow pilot and another section engaging the bowed portion of the shaft for rotating the shaft to effect the adjustment of the disks, and a connection between the bowed shaft and the truck.

11. A truck including a front axle, knuckles pivotally mounted on the axle, arms extending laterally from the knuckles, a rod connecting said arms, an extension rod secured to the first mentioned rod, a frame pivotally mounted on the extension rod and including spaced rods connected by a tubular member, a bowed shaft journaled in the rods of the frame and provided with co-acting disks, a fork mounted on the bowed shaft and provided with an extension, a transverse bar secured to the truck and having one end thereof extended laterally beyond the adjacent side of the truck, a tubular member secured to the transverse bar and adapted to receive the extension of the fork, a spring interposed between the tubular member and fork, and a sectional rod forming a connection between the tubular member of the frame and bowed portion of the shaft for rotating the latter to adjust the disks.

12. A truck including front and rear axles, ground wheels journaled on the rear axle, knuckles pivotally mounted on the front axle, forward wheels journaled on the knuckles, arms secured to said knuckles, a rod connecting the arms, an upstanding loop secured to the rod, a steering rod journaled on the truck and provided with a crank arm operating in the loop, and a furrow pilot operatively connected with the first mentioned rod for automatically tilting the front wheels of the truck to effect the steering of the latter.

In testimony whereof, I affix my signature in presence of two witnesses.

JOHN Y. JAMES. [L. S.]

Witnesses:
SAMUEL N. ACKER,
W. N. WOODSON.